United States Patent
Moeller et al.

(10) Patent No.: US 6,941,081 B2
(45) Date of Patent: Sep. 6, 2005

(54) METHOD AND APPARATUS FOR POLARIZATION MEASUREMENTS

(75) Inventors: Lothar B. Moeller, Hazlet, NJ (US); Paul Stephen Westbrook, Chatham, NJ (US)

(73) Assignee: Fitel USA Corp., Norcross, GA (US)

( * ) Notice: Subject to any disclaimer, the term of this patent is extended or adjusted under 35 U.S.C. 154(b) by 636 days.

(21) Appl. No.: 09/782,098

(22) Filed: Feb. 13, 2001

(65) Prior Publication Data

US 2002/0044282 A1 Apr. 18, 2002

Related U.S. Application Data

(60) Provisional application No. 60/228,265, filed on Aug. 25, 2000, and provisional application No. 60/229,129, filed on Aug. 30, 2000.

(51) Int. Cl.[7] .......................... H04B 10/06; H04B 10/00
(52) U.S. Cl. ........................ 398/205; 398/152; 398/206
(58) Field of Search .................... 398/65, 152, 184, 398/205, 206; 250/225; 356/73.1

(56) References Cited

U.S. PATENT DOCUMENTS

| | | | | |
|---|---|---|---|---|
| 4,773,063 A | * | 9/1988 | Hunsperger et al. ........... | 398/87 |
| 5,212,743 A | * | 5/1993 | Heismann ..................... | 385/11 |
| 5,227,623 A | | 7/1993 | Heffner ....................... | 250/225 |
| 5,371,597 A | * | 12/1994 | Favin et al. .................. | 356/367 |
| 5,388,088 A | | 2/1995 | Gans et al. ................... | 359/122 |
| 5,625,727 A | * | 4/1997 | Liedenbaum et al. ......... | 385/16 |
| 5,734,473 A | | 3/1998 | Gerhart et al. ............... | 356/364 |
| 5,796,479 A | | 8/1998 | Derickson et al. .......... | 356/326 |
| 5,815,270 A | * | 9/1998 | Lee ............................. | 356/367 |
| 6,002,822 A | | 12/1999 | Strasser et al. ............... | 385/48 |
| 6,078,709 A | | 6/2000 | Abramov et al. ............. | 385/37 |
| 6,211,957 B1 | * | 4/2001 | Erdogan et al. ............. | 356/364 |
| 6,377,719 B1 | * | 4/2002 | Damask ........................ | 385/11 |
| 6,519,027 B1 | * | 2/2003 | Gordon et al. ............. | 356/73.1 |
| 6,647,176 B1 | * | 11/2003 | Pua et al. ..................... | 385/24 |
| 2002/0093643 A1 | * | 7/2002 | Moeller ...................... | 356/73.1 |

FOREIGN PATENT DOCUMENTS

| | | | | |
|---|---|---|---|---|
| EP | 0 863 626 A2 | 9/1998 | .......... | H04B/10/08 |
| EP | 0 982 882 A2 | 3/2000 | .......... | H04B/10/18 |

OTHER PUBLICATIONS

U.S. Appl. No. 09/518,296, filed Mar. 3, 2000, entitled Method and Apparatus for On–Line Monitoring of Polarization Mode Dispersion in a Transmission System.

"Survey of Methods for the Complete Determination of a State of Polarization," by P.S. Hauge, in SPIE, vol. 88, Polarized Light, pp. 3–10, 1976.

"In–line, Light–Saving Photopolarimeter and its Fiber–Optic Analog," by R.M.A. Azzam, Optics Letters, vol. 12, No. 8, pp. 558–560.

* cited by examiner

*Primary Examiner*—Jason Chan
*Assistant Examiner*—Nathan Curs
(74) *Attorney, Agent, or Firm*—Moser, Patterson & Sheridan, LLP

(57) ABSTRACT

A method and apparatus for polarization measurements. A polarization state of an optical signal can be determined using a polarization analyzer comprising a polarization controller, a polarizer, a wavelength dispersive element and a photo-detector. The method and apparatus can be applied to polarization and polarization mode dispersion measurements in wavelength division multiplexed communication systems.

25 Claims, 8 Drawing Sheets

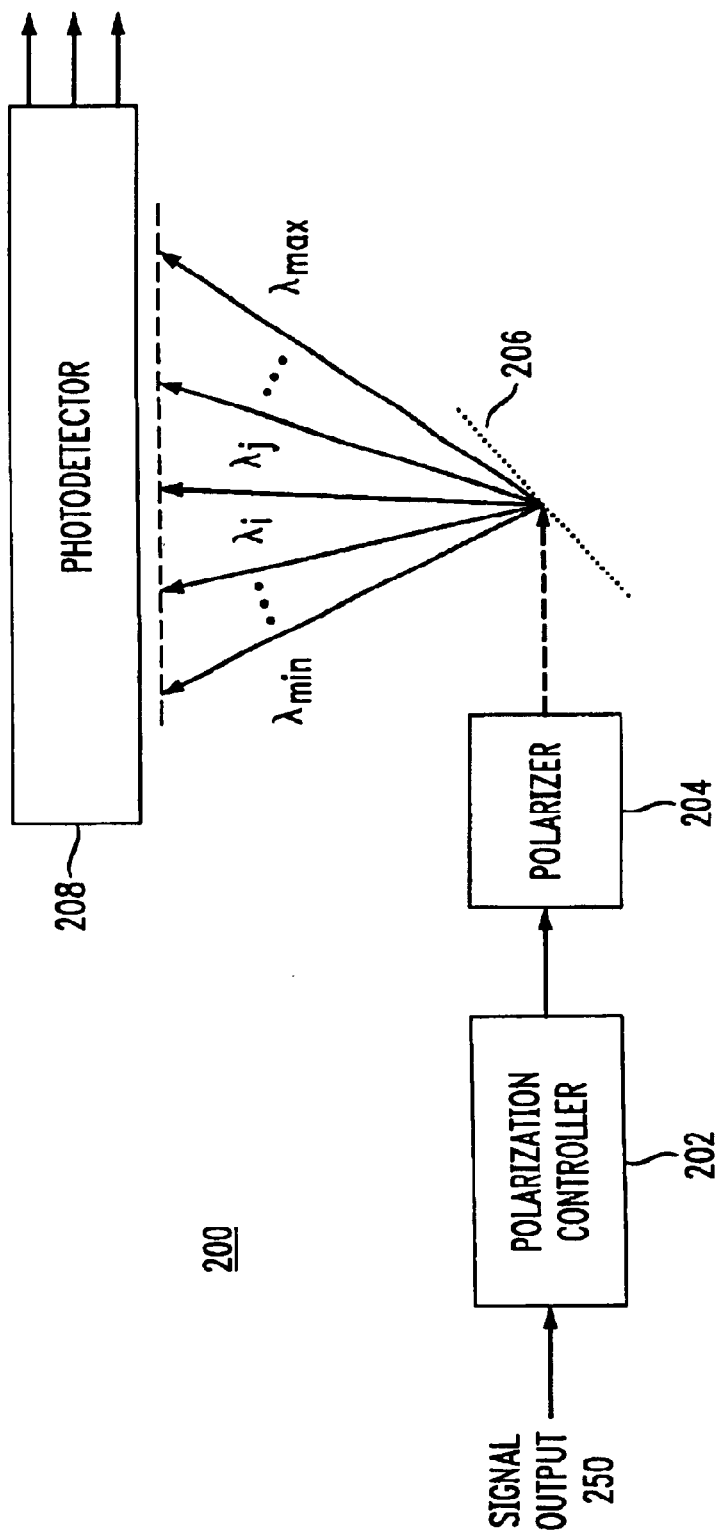

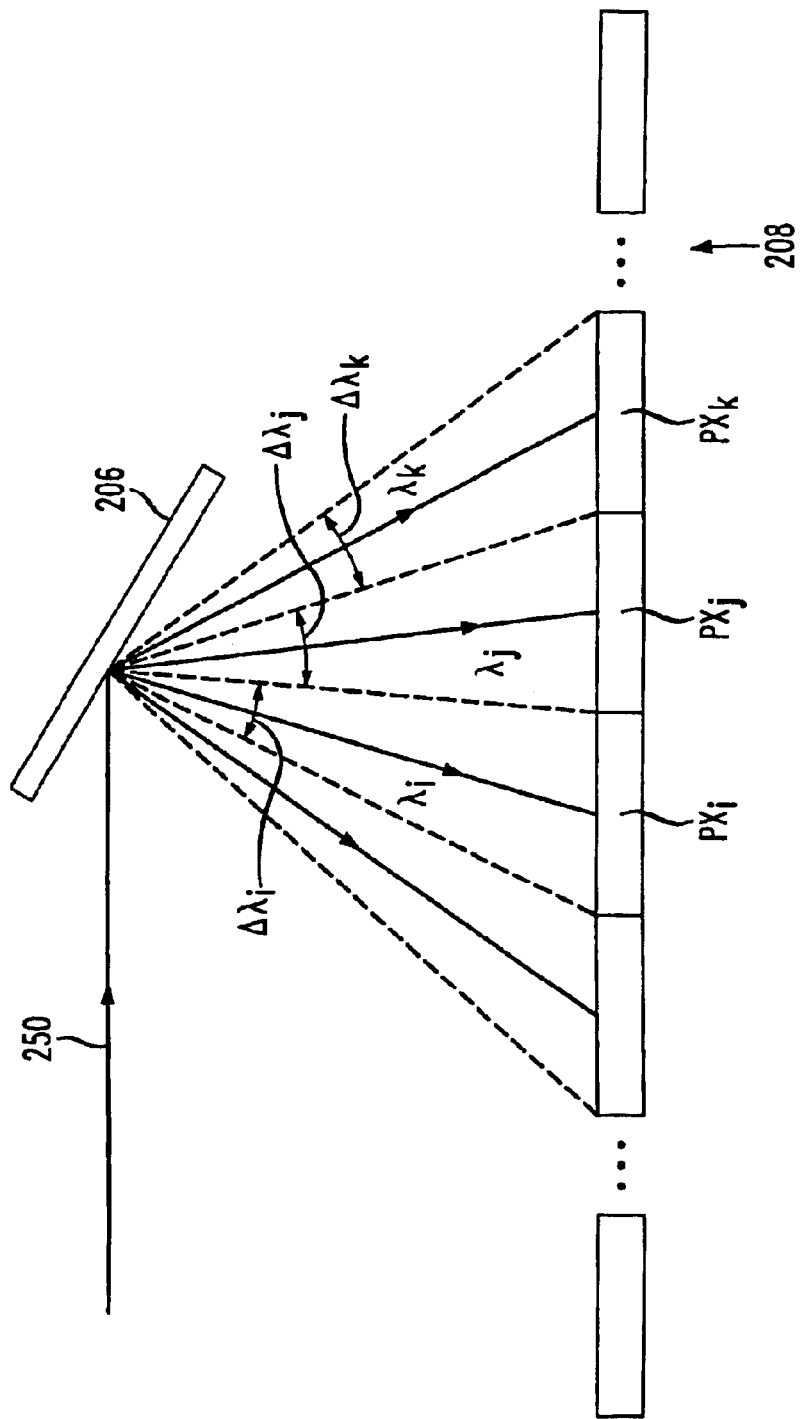

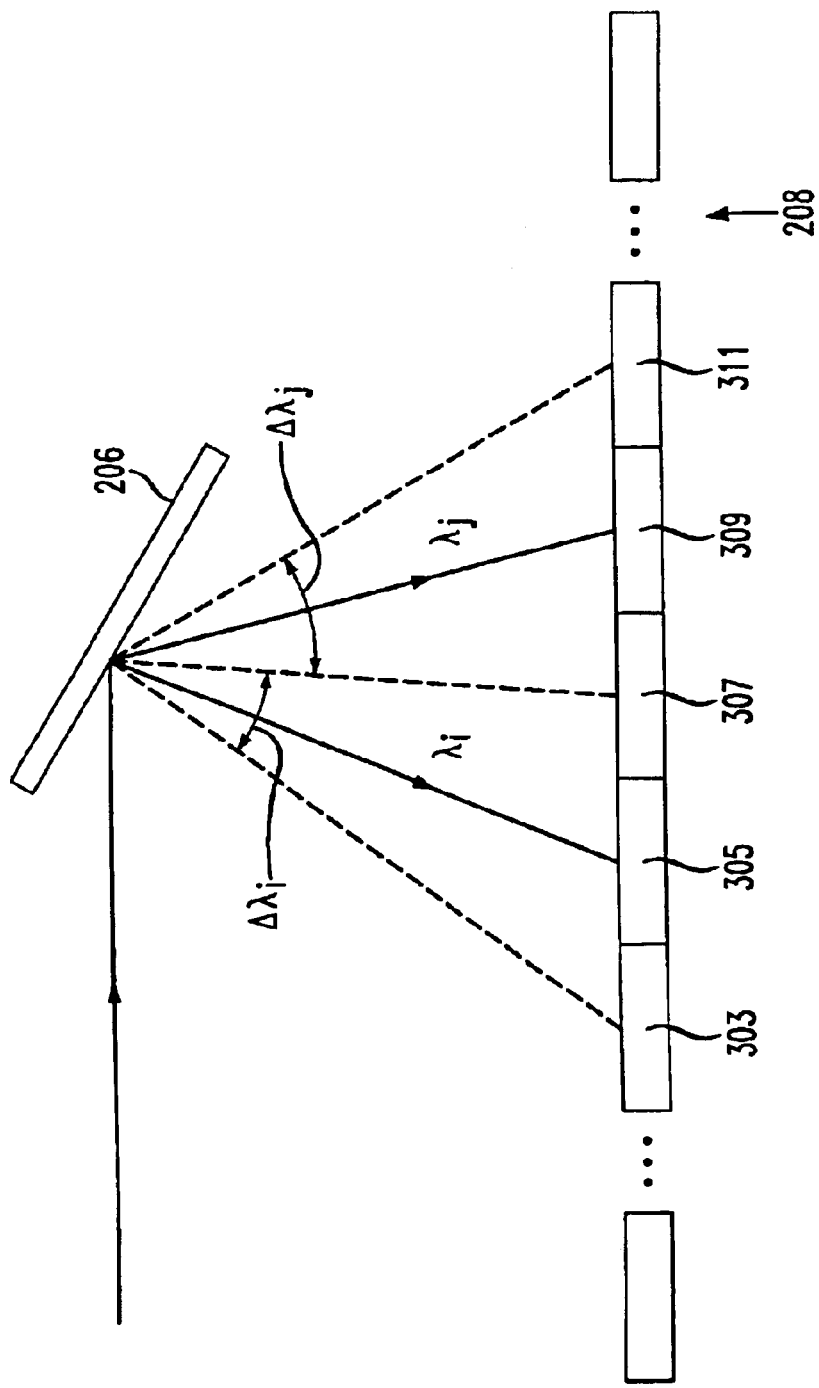

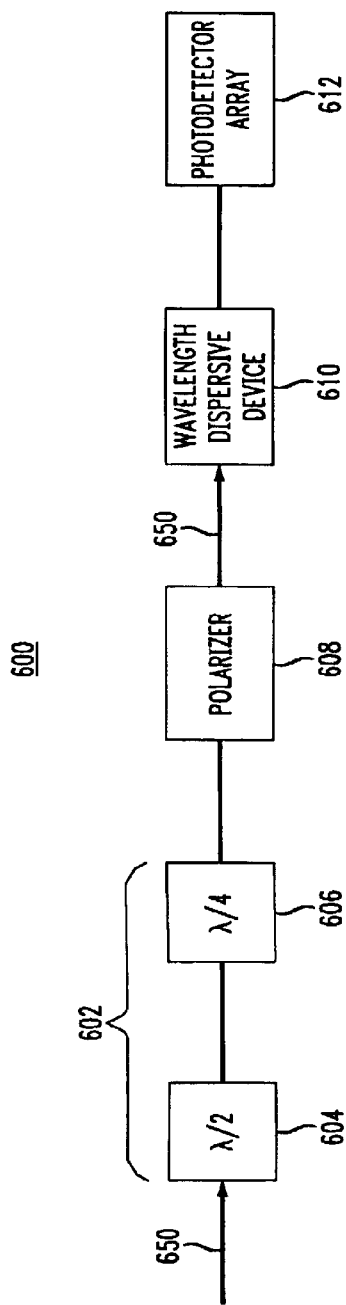
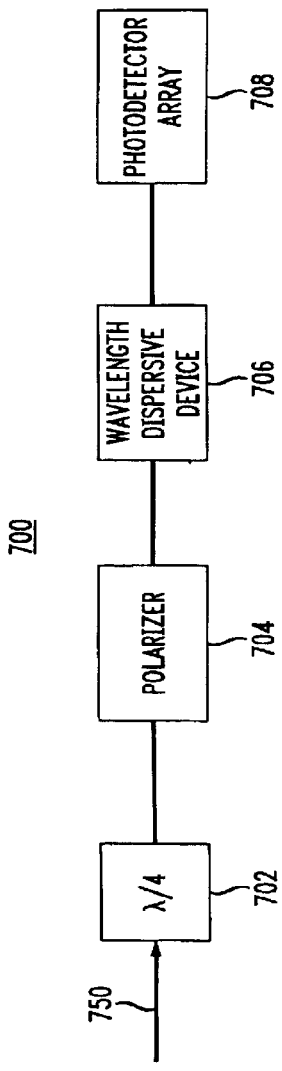

METHOD AND APPARATUS FOR POLARIZATION MEASUREMENTS

CROSS REFERENCES TO RELATED APPLICATIONS

This application claims priority to U.S. provisional application No. 60/228,265, entitled "Method and Apparatus for Polarization Measurements," filed Aug. 25, 2000, which is incorporated herein by reference in its entirety.

This application is related to U.S. provisional application No. 60/229,129, entitled "System Comprising In-Line Wavelength Sensitive Polarimeter," filed Aug. 30, 2000, which is incorporated herein by reference in its entirety.

TECHNICAL FIELD

The invention relates to a method and apparatus for polarization measurements and, more particularly, to a method and apparatus for frequency-resolved polarization measurements of an optical signal in wavelength division multiplexed systems.

BACKGROUND OF THE INVENTION

The demand for transmission capacity enhancement in fiber networks and for low cost per bit for high bit-rate systems requires continuous improvement in single channel bit-rates. Electrical time division multiplexed (ETDM) systems at bit-rates of 40 Gb/second per channel are commercially available, and optical time division multiplexed (OTDM) systems offering bit-rates of 160 Gb/s per channel have been demonstrated.

Aside from other transmission impairments like chromatic dispersion or non-linear pulse propagation, polarization mode dispersion (PMD) remains an obstacle to be overcome before these ultra high time division multiplexed (TDM) systems can be implemented on a significant number of installed fibers. Several different PMD compensation and mitigation techniques have been proposed and partially demonstrated. They can be generally categorized according to concepts based on the electrical or optical domains of the system. Electrical mitigation techniques possess advantages in terms of cost and size. However, the performance improvements from electrical techniques are generally not as great as those achievable with optical compensation techniques.

For example, optical techniques can be designed to be bit-rate and format independent. The measurement of the polarized components of an optical signal may be used for implementing PMD compensation using optical techniques.

Aside from PMD compensation, simple polarization monitoring will also be an important feature in future networks employing polarization multiplexing. Furthermore, polarization measurement is required as well for signal polarization adaptation to polarization sensitive receivers.

SUMMARY OF THE INVENTION

The invention relates generally to a method and apparatus for polarization measurements. A polarization state of an optical signal can be determined using a polarization analyzer comprising a polarization controller, a polarizer, a wavelength dispersive element, and a photo-detector.

In one embodiment, the photo-detector is a photodiode array. To determine the polarization state of the optical signal, optical power measurements are performed as a function of wavelengths within the optical signal for different settings of the polarization controller. The method can be applied to polarization and polarization mode dispersion determinations in wavelength division multiplexed (WDM) systems.

BRIEF DESCRIPTION OF THE DRAWINGS

The teachings of the present invention can be readily understood by considering the following detailed description in conjunction with the accompanying drawings, in which:

FIG. 2 is a schematic representation of a polarization analyzer according to one embodiment of the invention;

FIGS. 3a–c are schematic illustrations of multichannel detection of a dispersed optical signal;

FIG. 6 is a schematic illustration of one example of a polarization analyzer of the invention; and FIG. 7 is a schematic illustration of another example of a polarization analyzer of the invention.

To facilitate understanding, identical reference numerals have been used, where possible, to designate identical elements that are common to the figures.

DETAILED DESCRIPTION OF THE INVENTION

The invention provides generally a method and an apparatus for measuring a polarization state of an optical signal. Polarization measurements can be performed using a polarization analyzer (or polarimeter) comprising a polarization controller, a polarizer, a wavelength dispersive element, and a photo-detector. In one embodiment, the polarization state and the power of a broadband optical signal are obtained by measuring the Stokes vector components of the optical signal.

The method and apparatus can also be applied to polarization mode dispersion (PMD) measurements. For example, embodiments of the invention can be applied to on-line measurements of polarization and PMD in a fiber link of a wave division multiplexed (WDM) system without data traffic interruption. By analyzing the frequency dependence of the polarization of the optical signal at a receiver input, the PMD characteristic of a WDM channel for the corresponding frequency interval can be determined. Results of the PMD measurements can be used to derive PMD compensation parameters. Alternatively, PMD compensation can also be implemented by measuring the degree of polarization (DOP) of a WDM signal using the polarization analyzer. Although the invention can be practiced in conjunction with any type of PMD compensator, it is particularly well-suited for use with optical compensators.

Figure 1:
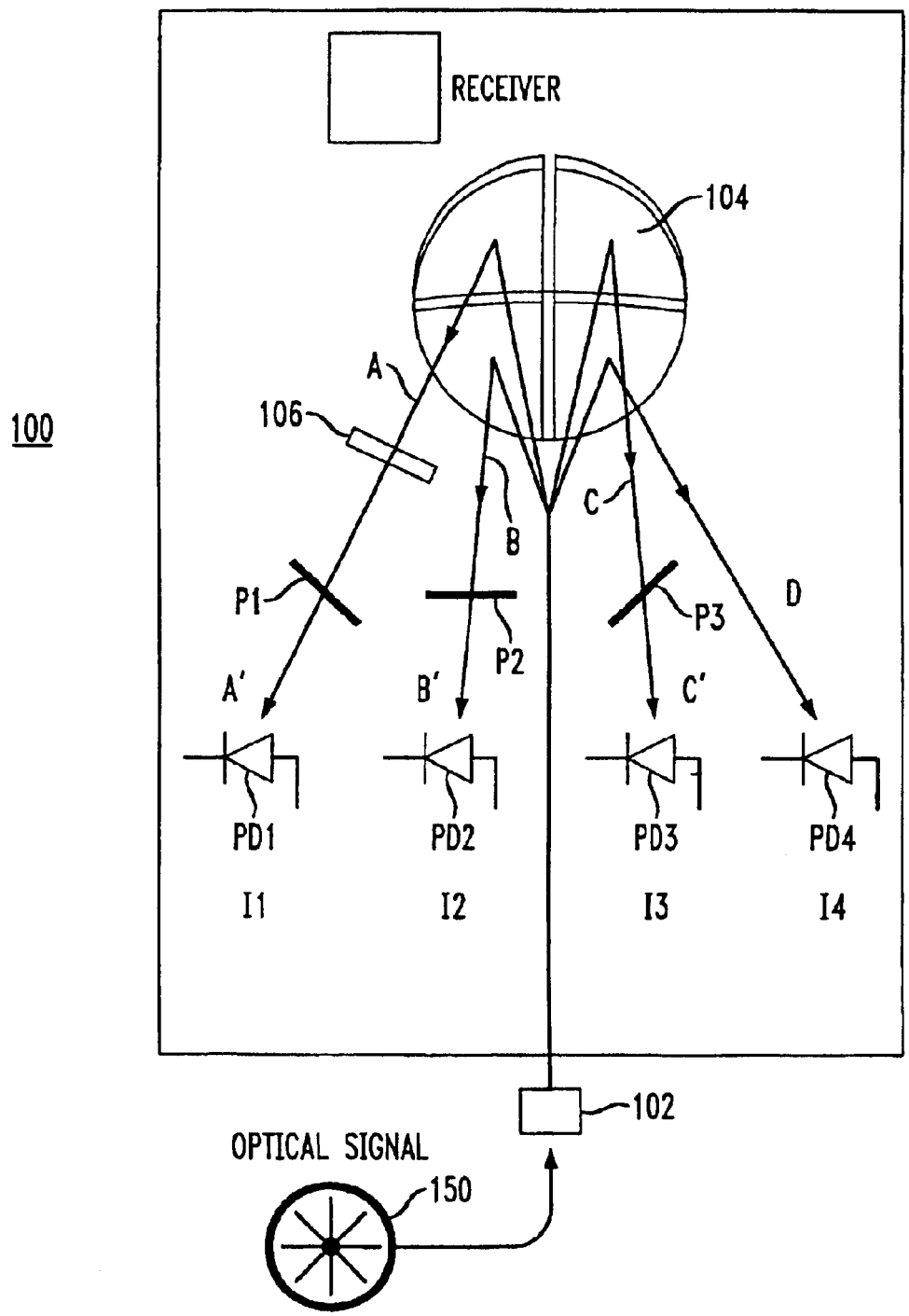
FIG. 1 is a schematic representation of a conventional polarization analyzer.

FIG. 1 is a schematic representation of a conventional polarimeter 100, e.g., a model HP 8509A, available from Hewlett-Packard, of Palo Alto, Calif. Details of such a polarimeter 100 are disclosed in U.S. Pat. No. 5,227,623, entitled "Method and Apparatus for Measuring Polarization Mode Dispersion in Optical Devices," which is incorporated herein by reference in its entirety.

An optical signal 150 having a polarization state to be determined is coupled to the polarimeter 100 via an optical connector 102. The optical signal 150 is directed onto a spherical mirror 104 and split into four components A, B, C and D by four adjustable quadrants of the spherical mirror 104. As shown in FIG. 1, three of the four components (A, B and C) are coupled into respective polarizers P1, P2 and P3. Prior to entering the polarizer P1, one of the optical signal components, e.g., A, is passed through a waveplate 106. The waveplate 106 is used to invert the polarization state of the signal component A. Each polarizer P1, P2 and P3 is set to different orientations, such that after passing through the respective polarizers, the optical components, denoted by A', B' and C', are characterized by different polarization components.

The intensities or powers of the four optical signal components A', B', C' and D are measured using photodiodes PD1, PD2, PD3 and PD4. The power of the fourth component, D, which is not filtered by any polarizer, is measured directly by the photodiode PD4. The photodiodes PD1, PD2, PD3 and PD4 provide four output photo-currents I1, I2, I3 and I4, which are proportional to the measured powers of the respective optical signal components A', B', C' and D. The Stokes parameters, which characterize the polarization state of the input optical signal 150, can be determined by analyzing the photo-currents I1, I2, I3 and I4, using techniques that are known in the art.

FIG. 2 is a schematic representation of a polarization analyzer 200 according to one embodiment of the invention. The polarization analyzer 200 comprises a polarization controller 202, a polarizer 204, a wavelength dispersive element 206, and a photo-detector 208.

The polarization controller 202 is used to perform defined polarization transformations of an incoming optical signal 250. Different types of polarization controllers 202 may be used to practice various embodiments of the invention, including mechanical, electromechanical and electro-optical devices. In general, mechanical devices tend to be slow compared to electro-optical ones. Therefore, electro-optical polarization controllers, e.g., lithium niobate-based devices, are preferable because they allow polarization state transformation to be performed at relatively high speeds, e.g., on the order of MHz.

In one embodiment, the polarizer 204 is a linear polarizer, and is selected to operate within a wavelength region of the optical signal 250.

The wavelength dispersive element 206 is used to disperse, or separate, the optical signal 250 into its spectral components within a wavelength range from $\lambda_{min}$ to $\lambda_{max}$, where $\lambda_{min}$ and $\lambda_{max}$ denote the lower and upper wavelength limits for the spectral range of the optical signal 250. Depending on their wavelengths, different spectral components are dispersed into different angles. It should be noted that the wavelengths $\lambda_i$ and $\lambda_j$ are used to denote spectral components characterized by central wavelengths $\lambda_i$ and $\lambda_j$, though each spectral component may further be characterized by a spectral range around the central wavelengths.

The polarization analyzer 200 is generally applicable to polarization measurements of input optical signals having either monochromatic or broadband spectra. For WDM applications, the optical signal 250 typically has a spectrum residing in telecommunication windows around 1.3 μm, 1.5 μm and 800 nm regions. In principle, the polarization analyzer 200 can be adapted to these signal wavelength regions.

The wavelength dispersive element 206 should have a bandwidth that is sufficiently large to encompass the bandwidth of the optical signal 250. In one embodiment, the wavelength dispersive element 206 is a grating, e.g., a diffraction grating, with a bandwidth of about 32 nm and a spectral resolution of about 0.1 nm. Other types of wavelength dispersive element 206 may also be used, e.g., a fiber grating, a prism or scanning etalon. In general, it is preferable that the wavelength dispersive element 206 does not involve mechanical scanning, in order to have improved reliability and increased speed for polarization measurement of a broadband signal.

Referring to FIG. 2, the dispersed spectral components $(\lambda_i, \lambda_j, \ldots)$ of the optical signal 250, which are separated spatially as a function of wavelength, are detected by a photo-detector 208. In one embodiment, the photo-detector 208 is a photodiode array, which comprises a series of pixels for detecting the dispersed spectral components $(\lambda_i, \lambda_j, \ldots)$ of the optical signal 250. One example of the photodiode array 208 is an optical channel monitor, which can be used for wavelength, power and optical signal to noise ratio (OSNR) measurements. Details of an optical channel monitor have been disclosed in U.S. Pat. No. 6,078,709, entitled "Method and Apparatus for Monitoring Multi-Wavelength Optical Systems," issued on Jun. 20, 2000, and in U.S. Pat. No. 6,002,822, entitled "Article Comprising An Optional Waveguide Tap," issued on Dec. 14, 1999, both of which are incorporated herein by reference. It is understood that other photodiode arrays or optical channel monitors may also be suitable for practicing embodiments of the invention. If the polarization analyzer 200 is used to measure polarization of a monochromatic optical signal, then a single photo-detector or photodiode may also suffice.

For WDM applications, spectral resolution of the polarization analyzer 200 is an important design parameter. The spectral resolution of the polarization analyzer 200 is determined by the combined resolution of the wavelength dispersive element 206 and that of the photodiode array 208. In order to perform frequency-sensitive (or wavelength-dependent) polarization measurements corresponding to different spectral components, the resolution of the polarization analyzer 200 should be sufficiently high to ensure that the resolved frequency interval is small enough such that the Stokes vector remains substantially constant within the resolution interval. In general, the appropriate resolution depends on the degree of accuracy that is desired for the polarization measurements, and may vary according to the specific needs or applications. It is understood that one skilled in the art would select a resolution to provide measurements within acceptable limits for specific applications.

FIG. 3a illustrates schematically the detection of the dispersed spectral components (e.g., $\lambda_i, \lambda_j, \lambda_k, \ldots$) by different pixels or channels ($PX_i, PX_j, PX_k, \ldots$) of the photodiode array 208. With sufficiently high resolution, each pixel of the detector array 208 detects a portion of the spectrum of the optical signal 250, corresponding to a spectral component that is sufficiently narrow such that there is no significant change in the Stokes vector, or polarization. As illustrated in FIG. 3a, spectral components $\lambda_i, \lambda_j, \lambda_k$ (each with its associated spectral range $\Delta\lambda_i, \Delta\lambda_j, \Delta\lambda_k$), are detected respectively by adjacent pixels $PX_i, PX_j,$ and $PX_k$. If the Stokes vectors for the spectral components $\lambda_i, \lambda_j, \lambda_k$ remain substantially constant within their respective spectral ranges, the optical powers detected by pixels $PX_i, PX_j,$ and $PX_k$ will correlate with the polarization parameters for the respective spectral components.

Figure 3B:
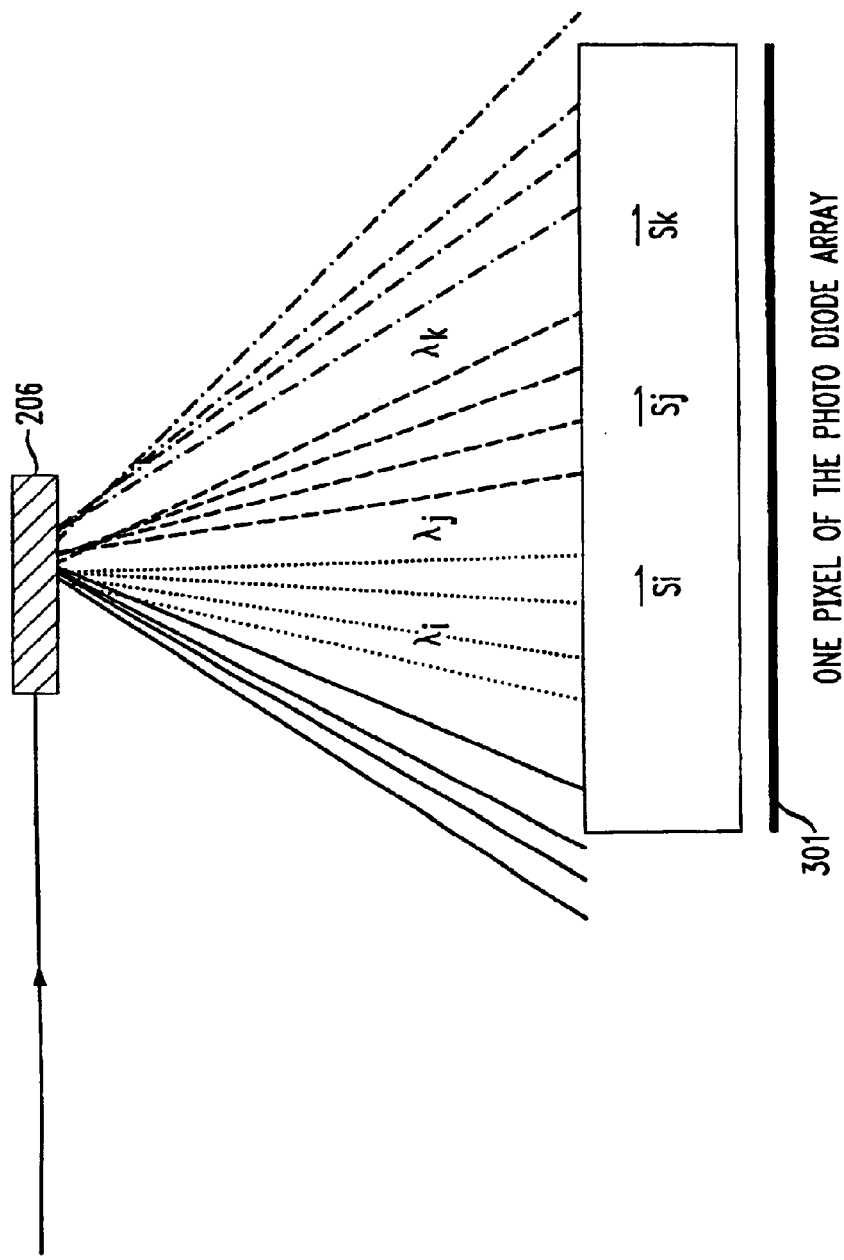

In contrast, FIG. 3b illustrates schematically the detection of dispersed spectral components with insufficient resolution of the polarization analyzer 200. As shown in FIG. 3b, one pixel 301 of the photodiode array 208 simultaneously detects several spectral components $\lambda_i$, $\lambda_j$, $\lambda_k$, each with slightly different polarization vectors $S_i$, $S_j$, $S_k$. The intensity (or contribution) of each spectral component, as detected by the pixel 301, is determined by the filter function of the wavelength dispersive element 206. Thus, instead of detecting signal contribution from one polarization state corresponding to a specific spectral component, the pixel 301 measures an average polarization state with a degree of polarization (DOP) smaller than one. The DOP describes how polarization vectors of different spectral components are aligned with respect to each other within the wavelength resolution of one pixel. If the polarization vectors are completely aligned, then DOP is at a maximum value of one. However, if the polarization vectors are not completely aligned, then DOP is less than one.

FIG. 3c illustrates yet another scenario in which each of the spectral components $\lambda_i$, $\lambda_j$ is detected by several detector pixels of the photodiode array 208. In this example, the spectral component $\lambda_i$ is detected by three pixels 303, 305 and 307; while the spectral component $\lambda_j$ is detected by three pixels 307, 309 and 311. Since pixels 303, 305, 309 and 311 contain signal contribution from only one spectral component $\lambda_i$ or $\lambda_j$, the photo-currents from these pixels (e.g., sum of 303 and 305 and sum of 309 and 311) are proportional to the signal intensity for the individual spectral components $\lambda_i$ and $\lambda_j$. Although the photo-current from pixel 307 contains contributions from both spectral components $\lambda_i$ and $\lambda_j$, it may still be possible to extract, using appropriate signal processing techniques, individual signal contributions for the determination of the polarization states for the spectral components $\lambda_i$ and $\lambda_j$.

In general, for WDM applications, the polarization analyzer 200 should have sufficient resolution to avoid polarization averaging over a wavelength interval in which the polarization or optical power can significantly vary. For example, it is preferable to avoid polarization averaging within one pixel, such as that illustrated in FIG. 3b, or at least within the signal bandwidths of adjacent WDM channels.

Method of Polarization Measurement

The polarization state of an optical signal can be determined using the polarization analyzer 200 of FIG. 2 by measuring the powers of the optical signal corresponding to several different polarization transformations of the polarization controller 202.

Figure 4:
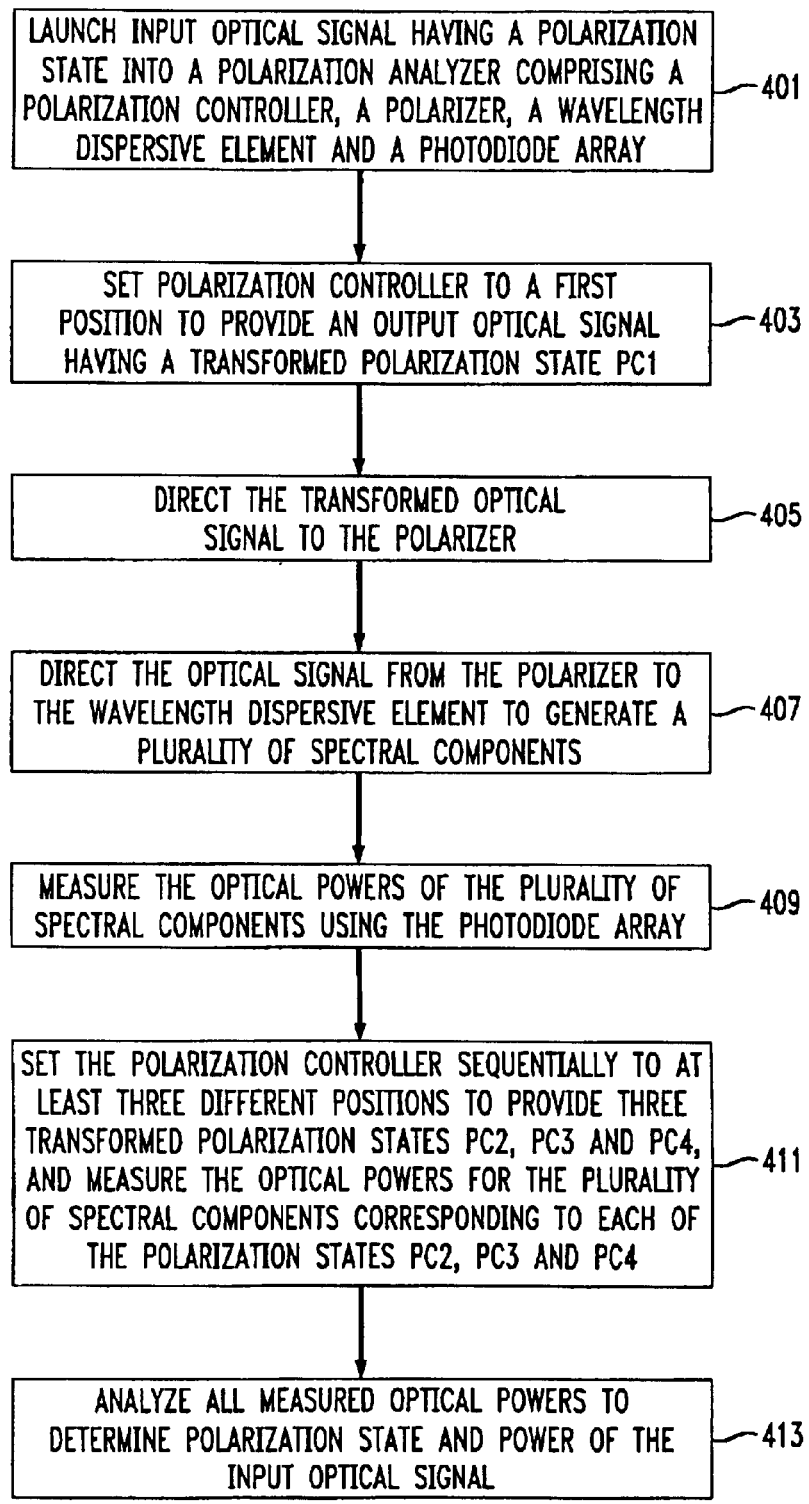
FIG. 4 is a flow diagram of a method of polarization measurement according to one embodiment of the invention.

FIG. 4 is a flow diagram of a method of polarization measurement according to one embodiment. In this embodiment, the Stokes vectors for the spectral components of the optical signal are measured and the polarization state and optical power of an optical signal can both be determined from the Stokes components.

The method can generally be applied to a variety of optical signals with different spectral ranges. For example, the optical signal may have a wavelength range in the 1.55 μm region, such as one that is used in WDM systems. Alternatively, the optical signal may have a broadband spectrum in other wavelength regions. Furthermore, the method may also be applied to a monochromatic optical signal.

At step 401, an input optical signal, characterized by an arbitrary polarization state to be determined, is launched into the polarization analyzer 200. At step 403, the polarization controller 202 is set to a first position, and the optical signal is converted from its arbitrary polarization state to a transformed polarization state PC1.

At step 405, the optical signal is directed to the linear polarizer 204, which is set at a fixed orientation to define a polarization axis for the exiting optical signal.

At step 407, the optical signal exiting the polarizer 204 is directed onto a wavelength dispersive element 206, which disperses the spectrum of the optical signal 250 as a function of wavelength. In general, the dispersed spectrum of the optical signal 250 may correspond to a continuum of wavelengths, or to a spectrum consisting of wavelengths corresponding to separate communication channels. In either case, the dispersed spectrum can be considered as being made up of different spectral components, with each spectral component characterized by a central wavelength and an associated spectral range (or spectral width). In the case of a WDM optical signal, one or more of the spectral components may correspond to individual optical channels of the WDM system.

At step 409, the optical powers of the spectral components are measured by a photo-detector 208 such as a photodiode array. Each of the spatially separated spectral components may be directed to one or more pixels of the photodiode array 208. A photo-current, which is proportional to the optical power of the detected spectral component, is generated in the photodiode array 208. The magnitudes of the measured photo-currents for the respective spectral components of the optical signal may be stored in a memory or processor for calculation of the Stokes components of the optical signal.

There are two aspects in practicing the invention for WDM applications. One aspect involves measurements of wavelength-dependent polarization (e.g., for a signal with a non-zero PMD), in which case, each signal corresponding to a WDM channel, which may comprise several spectral components, illuminates (i.e., be detected by) several pixels. However, at least some pixels of the photodiode array should each detect primarily a frequency or wavelength range within which the Stokes vector remains substantially constant, in order to avoid polarization averaging.

The other aspect involves measuring the degree of polarization (DOP) of the optical signal. In this case, it is sufficient that each signal corresponding to a WDM channel illuminates only one pixel in the photodiode array (even if the polarization state changes within the bandwidth of one WDM channel), as long as no two signals corresponding to two WDM channels illuminate the same pixel. However, the resolution of the polarization analyzer, which can be limited by the wavelength dispersive element, should at least be sufficiently high to avoid polarization averaging between different WDM channels. In either aspect of practicing the invention, the resolution is selected to provide measurements within acceptable tolerance for the specific applications.

Similar optical power measurements are subsequently performed, as shown in step 411, with the polarization controller 202 set to at least three other positions, each of which is different from the first position and from each other. In general, many different combinations of four positions may be used for the polarization controller 202 in performing the polarization measurement according to the method of the invention. For example, one possible combination of four settings of the polarization controller 202 may consist of launching a signal with transverse electric (TE) mode into the polarization controller 202. The polarization controller 202 may be set sequentially to produce four output or transformed polarization states. If one uses a Poincare sphere representation of Stokes vectors for describing the polarization states of the signal, then these four transformed polarization states should preferably have maximum spacings from each other on the Poincare sphere—e.g., forming a tetrahedron.

For each of the spectral components, the measured optical powers corresponding to the four positions of the polarization controller 202 may be analyzed, using relationships that are known in the art, to generate or calculate the Stokes vector components, or Stokes parameters, which describe polarization and optical power of the optical signal.

In general, the four power measurements are related to the four Stokes parameters by a 4×4 matrix, known as a calibration or instrument matrix, which may be determined by a calibration procedure known in the art. Details of a suitable calibration procedure has been described by R. M. A. Azzam, in "In-line, Light-Saving Photopolarimeter and its Fiber-Optic Analog", Optics Letters, Vol. 12, No. 8, pp.558–560, 1987, which is incorporated herein by reference in its entirety. Depending on the wavelength dispersive element, or optical couplings between the polarization controller, the polarizer and the wavelength dispersive element, the calibration matrix may potentially be different for every detector pixel. Once the calibration matrix has been determined, the four Stokes parameters can be obtained by multiplying the four power measurements generated by each detector pixel with the corresponding calibration matrix for the detector pixel.

The polarization state corresponding to the spectral components may then be determined from the Stokes parameters. It is noted that power measurements corresponding to at least four transformed polarization states PC1, PC2, PC3 and PC4 (corresponding to four positions of the polarization controller 202) are necessary to provide sufficient data to determine the original polarization state described by the Stokes vector and the power of the input optical signal. Additional measurements, i.e., corresponding to more than four transformed polarization states, are not precluded, although they are not necessary.

It is understood that the method of FIG. 4 illustrates only one application of the polarization analyzer 200. Thus, the polarization analyzer 200 may also be used in other applications which do not require measurements corresponding to four different settings of the polarization controller 202. For example, if the power of the input optical signal is not required, then less than four measurements may suffice to provide polarization or other desired information for the optical signal. Thus, depending on the specific information desired, the polarization analyzer 200 can generally be used for various optical measurements by generating different numbers of transformations corresponding to different positions (may be more than or less than four) of the polarization controller 202.

Several examples are provided below to further illustrate different polarization transformations that can be used for practicing the invention.

EXAMPLE 1

FIG. 6 is a schematic illustration of a polarization analyzer 600, comprising a polarization controller 602, a polarizer 608, a wavelength dispersive device 610, and a photodetector array 612. In this example, the polarization controller 602 consists of a half-wave plate 604 and a quarter-wave plate 606. An optical signal 650 having a certain polarization state passes through the half-wave plate 604, the quarter-wave plate 606 and the polarizer 608. After exiting the polarizer 608, the optical signal 650 is dispersed by the wavelength dispersive device 610, and the dispersed signal is subsequently detected by the photodetector array 612.

The orientations of the half-wave plate 604, the quarter-wave plate 606 and the polarizer 608 are represented respectively by $\theta_{1/2}$, $\theta_{1/4}$ and $\theta_a$. Table 1 provides one example of the four positions or transformations of the polarization controller 602 (each position being defined by $\theta_{1/2}$, $\theta_{1/4}$ and $\theta_a$) that can be used for practicing the invention. The orientations of the half-wave plate 604 and the quarter-wave plate 606 are given as angular rotation (in degrees) relative to the orientation of the polarizer 608. By performing power measurements for the dispersed signal at each of the four positions of the polarization controller 602, Stokes parameters for the optical signal 650 can be obtained and used for the determination of the polarization state of the optical signal.

TABLE 1

|   | $\theta_{1/2}$ | $\theta_{1/4}$ | $\theta_a$ |
|---|---|---|---|
| 1 | 0 | 0 | 0 |
| 2 | 22.5° | 0 | 0 |
| 3 | 45° | 0 | 0 |
| 4 | 22.5° | 45° | 0 |

In another embodiment, the order of the half-wave plate 604 and the quarter-wave plate 606 may be interchanged such that the optical signal 650 passes through the quarter-wave plate 606 before the half-wave plate 604. In that case, the orientations of the half-wave plate 604 and the quarter-wave plate 606 corresponding to the four transformations of the polarization controller 602 will be different from those shown in Table 1. One skilled in the art will be able to devise suitable orientations for practicing alternative embodiments of the invention.

EXAMPLE 2

FIG. 7 is a schematic illustration of a polarization analyzer 700, comprising a polarization controller 702, a polarizer 704, a wavelength dispersive device 706, and a photodetector array 708. In this example, the polarization controller 702 is a quarter-wave plate with an orientation denoted by $\theta_{1/4}$. To practice the invention, an optical signal 750 having a certain polarization state passes through the polarization controller 702 and the polarizer 704. The signal 750 exiting the polarizer 704 is dispersed using the wavelength dispersive device 706, and the dispersed signal is detected by the photodetector array 708.

With the polarizer 704 maintained at a fixed orientation $\theta_a$, the orientation $\theta_{1/4}$ of the polarization controller 702 is varied continuously as a function of time—e.g., by rotating the quarter-wave plate through different positions at a given rate. The dispersed signal intensity (I) detected by the photodetector array 708 can be represented by the following equation:

$$I = 0.5[(S_0 + S_1/2) + \quad\quad\quad\quad\quad\quad\quad\quad\text{Eq. (1)}$$
$$(S_1/2)\cos(4\theta_{1/4}) + (S_2/2)\sin(4\theta_{1/4}) - S_3\sin(2\theta_{1/4})$$

where $S_0$, $S_1$, $S_2$, and $S_3$ are the respective Stokes parameters of the optical signal 750.

The Stokes parameters $S_0$, $S_1$, $S_2$ and $S_3$ may be obtained by performing a Fourier analysis of the detected signal spectrum. By performing Fourier analysis for all spectral components, a wavelength dependent polarization of the optical signal 750 can be determined. Techniques of performing Fourier analysis for single wavelength applications have been disclosed in "Survey of Methods for the Complete Determination of a State of Polarization", by P. S. Hauge, in SPIE vol. 88, *Polarized Light*, pp. 3–10, 1976, which is incorporated herein by reference in its entirety.

EXAMPLE 3

In another embodiment, the polarization analyzer may be used to measure spectral power density of an optical signal having a certain polarization state. In this case, it is only necessary that the polarization controller be set at two different positions to provide the transformations necessary for power density measurements. In one example, the two positions of the polarization controller may differ from each other by 90°, producing transformations corresponding to the TE and TM modes respectively. Depending on the specific applications, different numbers of orientations of the polarization controller may also be used to generate other optical measurements, as appropriate.

On-line PMD Measurement in a Transmission System

According to another aspect of the invention, the polarization analyzer 200 can be used for measurement of polarization mode dispersion (PMD) in a transmission system. In particular, it can be used as part of a PMD monitoring unit for on-line PMD measurement, concurrent with data transmission (i.e., without interrupting data transmission) in a WDM system. On-line PMD measurements using a conventional polarization analyzer has previously been disclosed in a commonly-assigned U.S. patent application Ser. No. 09/518,296, entitled "Method and Apparatus for On-Line Monitoring of Polarization Mode Dispersion in a Transmission System," filed on Mar. 3, 2000, which is herein incorporated by reference in its entirety.

Figure 5:
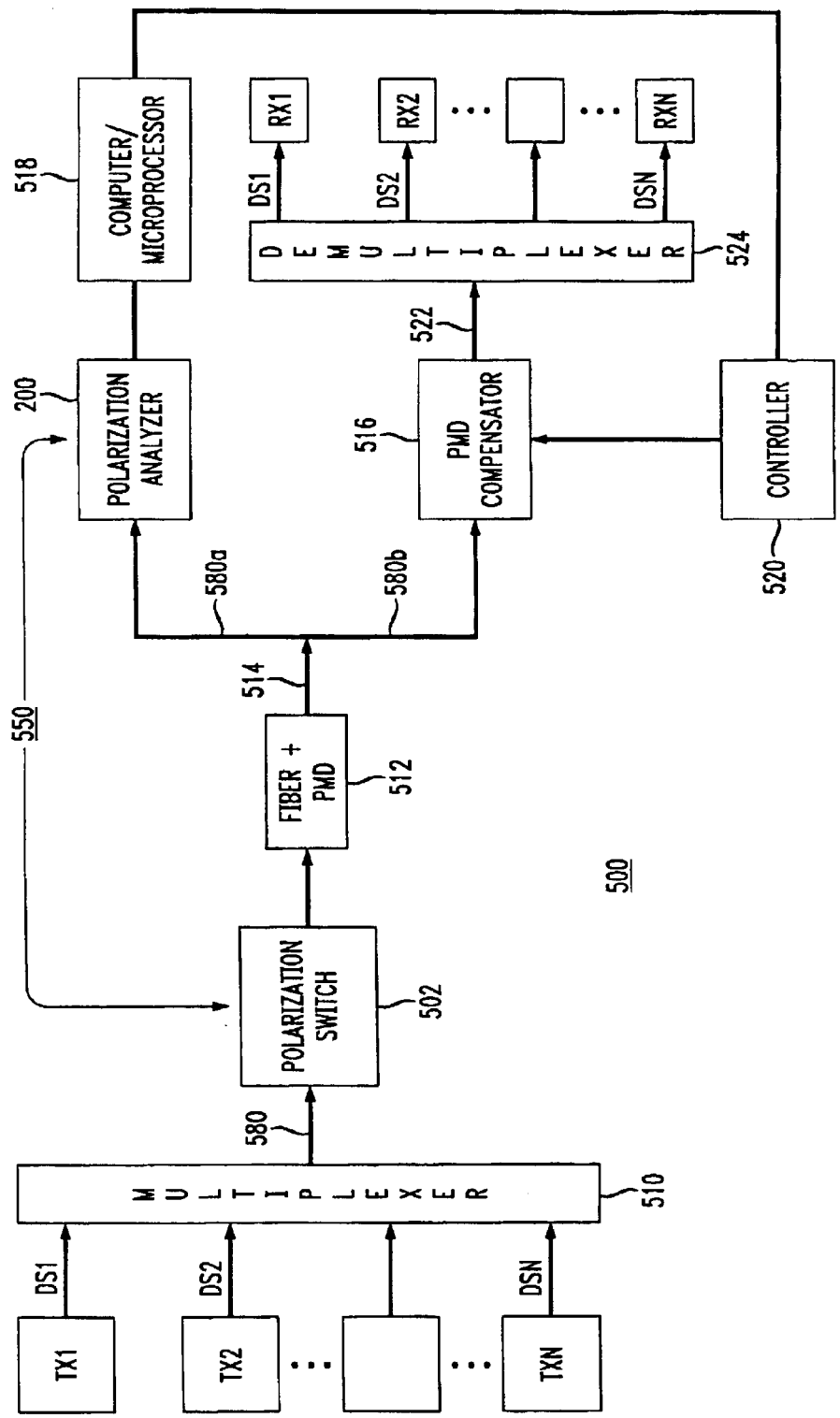
FIG. 5 is a schematic representation of a transmission system incorporating one embodiment of the invention.

FIG. 5 shows a schematic diagram of a WDM transmission system 500 containing a PMD monitor 550 for on-line PMD measurement. The PMD monitor 550 comprises a polarization switch 502 and the polarization analyzer 200.

In the WDM transmission system 500, different transmitters (TX1, TX2, . . . , TXN) are used to generate light (or optical carrier) at different wavelengths for data transmission. The carrier signals are modulated by respective data bit streams to form data signals DS1, DS2, . . . , DXN. These data signals DS1, DS2, . . . , DXN, having different carrier wavelengths are combined in a multiplexer 510 to form a single optical signal 580.

The optical signal 580, which is illustratively, linearly polarized, is coupled into a polarization switch 502 before entering the transmission line 512. The polarization switch 502 allows the output polarization of the optical signal 580 to be varied. For example, the optical signal 580 may be switched between two non-orthogonal linear polarization states, which have a relative angle of 45° (in Jones space) with respect to each other. Many devices may be used as the polarization switch 502 for rotating the polarization of the optical signal 580, with one example being a Pockels cell.

In the schematic representation of FIG. 5, it is assumed that the transmission fiber 512 represents the entire transmission line characterized by a polarization mode dispersion (PMD) to be monitored using embodiments of the invention. At its output end 514, the transmission fiber 512 is connected respectively to the polarization analyzer 200 and a PMD compensator 516. As such, the transmission signal 580 is split into two portions—one portion 580a being coupled into the polarization analyzer 200, and another portion 580b being coupled to the PMD compensator 516.

The polarization analyzer 200 is also connected to a computer or a microprocessor 518 that communicates with the polarization analyzer 200 and a controller 520 for controlling the PMD compensator 516. Alternatively, the controller 520 may be incorporated as part of the computer 518.

The PMD compensator 516 is connected at its output 522 to a demultiplexer 524 for separating the transmitted signal 580b into its respective channel components DS1, DS2, . . . , and DSN. The optical signals of the respective channels are detected by a number of receivers RX1, RX2, . . . , RXN. Typically, the polarization analyzer 200 and the PMD compensator 516 are located in close proximity to the receivers RX1, RX2, . . . , RXN, to allow accurate PMD compensation for the data signal 580b arriving at the receivers RX1, RX2, . . . , RXN.

In an alternative embodiment, the polarization analyzer 200 may be connected to the output 522 of the PMD compensator 516 such that the transmitted signal 580 exiting the PMD compensator 516 may be split into two portions, with one portion directed to the polarization analyzer 200, and another portion to the demultiplexer 524. This arrangement is illustrated in phantom in FIG. 5. In general, the polarization analyzer 200 of the invention can be used in conjunction with any PMD compensator 516, including electrically-based and optically-based compensators.

The polarization switch 502 and the polarization analyzer 200, which collectively form the PMD monitor 550, can be used to provide real-time, on-line PMD measurements for the transmission fiber 512. Since the signal source used for PMD measurement is provided by the transmission or data signal 580 (as opposed to an external signal source), embodiments of the invention allow PMD measurements to be performed concurrent with data transmission in the transmission system 500, without interrupting data transmission.

To determine the PMD of the transmission fiber 512, it is necessary to perform polarization measurements for at least two different and non-orthogonal polarization states of the optical signal 580 launched into the transmission fiber 512. For example, with the polarization switch 502 set at a first orientation, a first set of polarization measurements may be performed according to steps such as those outlined in FIG. 4. Subsequently, a second set of polarization measurements is performed with the polarization switch 502 set at a second orientation, e.g., about 45° with respect to the first position. It is noted that polarization switching should not affect the signal propagation in an intensity modulated direct detection (IMDD) system, at least in the absence of fiber nonlinearities, as long as polarization dependent losses can be neglected, and PMD has been compensated for. The measured wavelength dependency of the Stokes vectors (i.e., polarization measurement as a function of wavelength) allows determination of PMD in the transmission fiber 512.

Results of these measurements are provided as input data to the computer or microprocessor 518, which then computes relevant parameters for the adjustment of the PMD compensator 516. Alternatively, based on results of the PMD measurements, PMD compensation parameters may also be retrieved from a look-up table that may be stored in the computer 518. These parameters are communicated to the controller 520 which then adjusts the PMD compensator 516, such that the optical signal 580b arriving at the demultiplexer 524 is compensated for any pulse distortion due to PMD in the transmission system 500.

According to another aspect of the invention, the polarization analyzer 200 may also be used to measure the degree of polarization (DOP) for PMD monitoring purpose—through measurement of the Stokes vectors of the transmitted signal 580. For example, the DOP may be used as an indicator of the presence of PMD in the transmitted signal 580, and such information may be used by the processor 518 to generate a control signal for controlling the PMD compensator 516.

In one embodiment, the polarization analyzer 200 is connected to the output of the PMD compensator 516, such that one portion of the transmitted signal 580 enters the polarization analyzer 200 and the other portion enters the demultiplexer 524. The DOP may be measured using the polarization analyzer 200 by performing optical power measurements for individual WDM channels, which are resolved by passing the transmitted signal 580 (after propagating through the polarization controller and the polarizer 202 and the polarizer 204) through the wavelength dispersive element. The optical powers measured by the detector array 208 corresponding to each of the individual WDM channels are then used to calculate Stokes components for the WDM channels, which in turn allows a determination of the DOP. The DOP data can be analyzed to derive information about PMD, which can then be used for controlling the PMD compensator 516.

Although several preferred embodiments which incorporate the teachings of the present invention have been shown and described in detail, those skilled in the art can readily devise many other varied embodiments that still incorporate these teachings.

What is claimed is:

1. A method of polarization measurement, comprising:
    (a) directing an optical signal characterized by a polarization state into a polarization controller, said polarization controller consisting of a half-wave plate followed by a quarter-wave plate each characterized by respective orientations;
    (b) directing the optical signal from the polarization controller into a polarizer;
    (c) directing the optical signal from the polarizer to a wavelength dispersive element to generate a dispersed optical signal comprising a plurality of spectral components each characterized by a wavelength range;
    (d) directing the dispersed optical signal into a photo-detector for detecting the plurality of spectral components;
    (e) setting the polarization controller to at least four different positions; wherein
    the first of the at least four different positions corresponds to setting the half-wave plate orientation and the quarter-wave plate orientation to be the same as an orientation of the polarizer;
    the second of the at least four different positions corresponds to setting the half-wave plate orientation at about 22.5 angular degrees with respect to the orientation of the polarizer, and setting the quarter-wave plate orientation to be the same as the orientation of the polarizer;
    the third of the at least four different positions corresponds to setting the half-wave plate orientation at about 45 angular degrees with respect to the orientation of the polarizer, and setting the quarter-wave plate orientation to be the same as the orientation of the polarizer; and
    the fourth of the at least four different positions corresponds to setting the half-wave plate orientation at about 22.5 angular degrees and the quarter-wave plate orientation at about 45 angular degrees with respect to the orientation of the polarizer;
    (f) for each of the plurality of positions of the polarization controller, measuring the power of the optical signal using the photo-detector; and
    (g) obtaining the polarization state of the optical signal by analyzing the powers of the optical signal measured in (f).

2. The method of claim 1, wherein (e) comprises rotating the quarter-wave plate continuously as a function of time.

3. The method of claim 1, wherein the photo-detector is a photodiode array comprising a plurality of detector pixels.

4. The method of claim 3, wherein at least a subset of the plurality of detector pixels each detects only a portion of the dispersed optical signal having a Stokes vector that remains substantially constant within each of the detector pixels in the subset of detector pixels.

5. The method of claim 4, wherein (g) further comprises:
    (g1) generating an optical power parameter for each subset of the plurality of detector pixels;
    (g2) analyzing the optical power parameter and a corresponding wavelength range detected by the subset of the plurality of detector pixels; and
    (g3) calculating Stokes components for the optical signal to obtain the polarization state of the optical signal.

6. The method of claim 1, further comprising:
    (h) calculating an optical power for the optical signal.

7. The method of claim 1, wherein the optical signal is a data signal in a wavelength division multiplexed (WDM) system and one or more of the plurality of spectral components in the dispersed optical signal correspond to a plurality of WDM optical channels.

8. A method of polarization measurement, comprising:
    (a) directing an optical signal characterized by a from the polarization state into a polarization controller;
    (b) directing the optical signal from the polarization controller into a polarizer;
    (c) directing the optical signal from the polarizer to a wavelength dispersive element to generate a dispersed optical signal comprising a plurality of spectral components each characterized by a wavelength range, wherein one or more of the plurality of spectral components has a corresponding Stokes vector that varies within the respective wavelength range
    (d) directing the dispersed optical signal into a photo-detector for detecting the plurality of spectral components;
    (e) setting the polarization controller to a plurality positions;
    (f) for each of the plurality of positions of the polarization controller, measuring the power of the optical signal using the photo-detector; and
    (g) obtaining at least one desired property of the optical signal by analyzing the powers of the optical signal measured in (f).

9. The method of claim 8, wherein the plurality of positions in (e) is at least two.

10. The method of claim 9, wherein the at least one desired property in (g) is a spectral power density of the optical signal.

11. The method of claim 8, wherein the plurality of positions in (e) is at least four, and the desired properties obtained in (g) are the polarization state and an optical power of the optical signal.

12. The method of claim 8, wherein the optical signal is a data signal in a wavelength division multiplexed (WDM) system characterized by a plurality of WDM channels.

13. The method of claim 12, wherein each of the plurality of WDM channels is detected by a different subset of a plurality of detector pixels.

14. The method of claim 13, wherein (g) further comprises calculating Stokes components corresponding to each of the plurality of WDM channels to obtain a degree of polarization for each of the plurality of WDM channels.

15. The method of claim 8, wherein the photo-detector is a photodiode array comprising a plurality of detector pixels.

16. The method of claim 15, wherein at least a subset of the plurality of detector pixels each detects only a portion of the dispersed optical signal having a Stokes vector that remains substantially constant within each of the detector pixels in the subset of detector pixels.

17. The method of claim 16, wherein (g) further comprises:
- (g1) generating an optical power parameter for each subset of the plurality of detector pixels;
- (g2) analyzing the optical power parameter and a corresponding wavelength range detected by the subset of the plurality of detector pixels; and
- (g3) calculating Stokes components for the optical signal to obtain the polarization state of the optical signal.

18. The method of claim 8, further comprising:
- (h) calculating an optical power for the optical signal.

19. The method of claim 8, wherein the optical signal is a data signal in a wavelength division multiplexed (WDM) system and one or more of the plurality of spectral components in the dispersed optical signal correspond to a plurality of WDM optical channels.

20. A method of monitoring polarization mode dispersion (PMD) in an optical fiber, comprising:
- (a) propagating a wavelength division multiplexed (WDM) optical signal comprising a plurality of WDM channels through the optical fiber;
- (b) directing the WDM optical signal into a PMD compensator;
- (c) determining a degree of polarization for each of the plurality of WDM channels by:
  - (c1) directing a first portion of the WDM optical signal from the PMD compensator into a polarization analyzer comprising a polarization controller, a polarizer, a wavelength dispersive element and a photo-detector array; wherein after the first portion of the WDM optical signal propagates through the polarization controller and the polarizer, the wavelength dispersive element disperses the first portion of the WDM optical signal into a plurality of spectral components corresponding to the plurality of WDM channels; and the photo-detector array detects the plurality of spectral components;
  - (c2) calculating Stokes parameters for each of the plurality of WDM channels by measuring an optical power with the photo-detector array for each of the plurality of WDM channels;
  - (c3) obtaining the degree of polarization from the Stokes parameters for each of the plurality of WDM channels;
- (d) deriving PMD information for the WDM optical signal from the degree of polarization for each of the plurality of WDM signal channels;
- (e) using the PMD information for the WDM optical signal for controlling the PMD compensator; and
- (f) directing a second portion of the WDM optical signal from the PMD compensator into a WDM receiver unit.

21. The method of claim 20, wherein the wavelength dispersive element is a diffraction grating.

22. The method of claim 20, wherein the photo-detector array is a photodiode array.

23. The method of claim 20, wherein the polarization controller is an electro-optic device.

24. The method of claim 23, wherein the electro-optic device is fabricated from lithium niobate.

25. A wavelength division multiplexed (WDM) communication system, comprising:
- (a) a plurality of transmitters for generating a plurality of optical signals corresponding to a plurality of optical channels in the WDM communication system;
- (b) a multiplexer for combining the plurality of optical signals into a multiplexed optical signal;
- (c) a polarization switch connected to an output of the multiplexer;
- (d) a transmission fiber connected to an output of the polarization switch for transmitting the multiplexed optical signal, wherein the transmission fiber is characterized by a polarization mode dispersion (PMD);
- (e) a polarization analyzer for receiving a first portion of the multiplexed optical signal transmitted through the transmission fiber, wherein the polarization analyzer comprises a polarization controller, a polarizer, a wavelength dispersive element and a photo-detector array;
- (f) a controller for generating a control signal responsive to a signal received from the polarization analyzer;
- (g) a PMD compensator responsive to the control signal, for converting a second portion of the multiplexed optical signal transmitted through the transmission fiber into a PMD-compensated multiplexed optical signal;
- (h) a demultiplexer connected to an output of the PMD compensator for decomposing the PMD-compensated multiplexed optical signal into a plurality of transmitted optical signals corresponding to the plurality of channels in the WDM system;
- (i) a plurality of receivers for detecting the plurality of transmitted optical signals.

* * * * *